Dec. 15, 1925.
R. J. JONES
RADIATOR SHUTTER
Filed Oct. 15, 1923
1,566,141
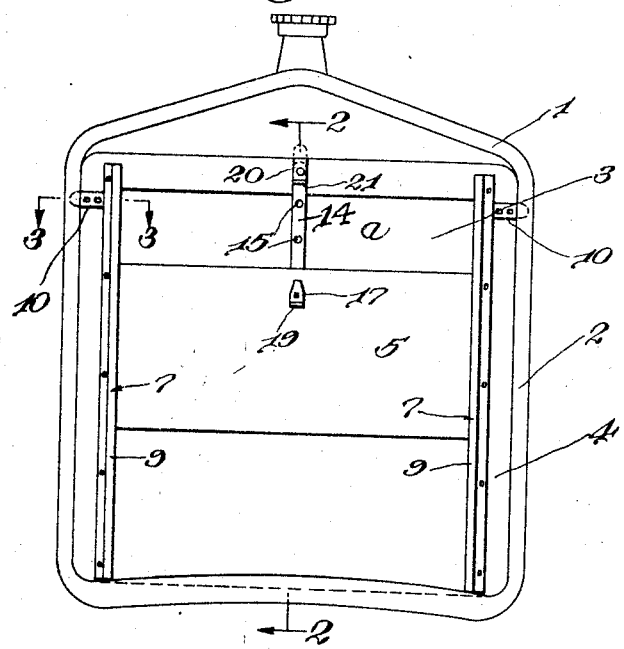
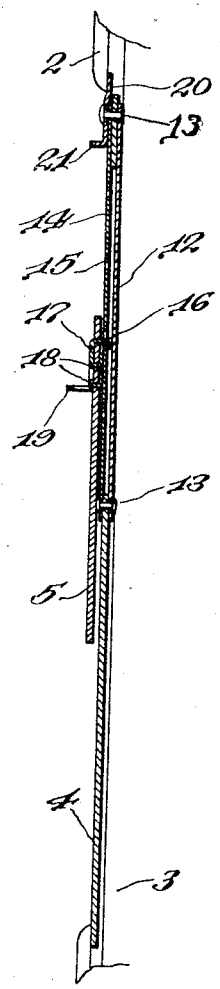
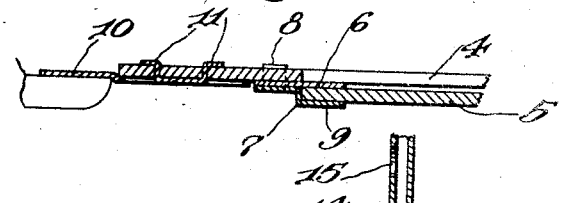
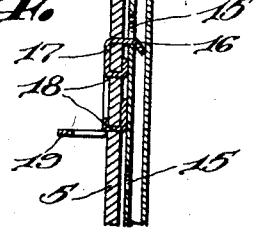
R. J. Jones INVENTOR
BY Victor J. Evans ATTORNEY
WITNESS:

Patented Dec. 15, 1925.

1,566,141

UNITED STATES PATENT OFFICE.

ROBERT J. JONES, OF CHICAGO, ILLINOIS.

RADIATOR SHUTTER.

Application filed October 15, 1923. Serial No. 668,685.

*To all whom it may concern:*

Be it known that I, ROBERT J. JONES, a citizen of the United States, residing at Chicago, in the county of Cook and State of Illinois, have invented new and useful Improvements in Radiator Shutters, of which the following is a specification.

This invention relates to new and useful improvements in shutters and more particularly to a shutter for use on motor vehicle radiators. The main object of my invention is the provision of an extremely simple shutter especially constructed for "Ford" motor vehicles whereby the same may be quickly and readily placed in position in front of the radiator for regulating the supply of air which usually passes in through the radiator to the engine compartment and also serves as a protector or shield for the radiator during the cold weather period.

Another object of my invention is the provision of a shutter especially adapted for use on the radiators of the "Ford" motor vehicle type having adjustable features whereby the supply of air passing through the radiator may be readily regulated and at the same time the device being provided with means whereby the same may be quickly and readily attached to the forward end of the radiator shell of the above type of vehicle and positioned directly in front of the radiator.

With the above and other objects in view the invention consists in the novel features in construction, the combination and arrangement of parts hereinafter more fully set forth, pointed out in the claims and shown in the accompanying drawings in which:

Fig. 1 is a front elevation of a motor vehicle hood showing my improved shutter in position.

Fig. 2 is a longitudinal sectional view taken on the line 2—2 of Fig. 1.

Fig. 3 is a detail transverse section taken on the line 3—3 of Fig. 1.

Fig. 4 is a detail enlarged longitudinal section illustrating the adjustable features of my invention.

Referring now more particularly to the drawings wherein reference characters are used to designate the several parts, the numeral 1 indicates the radiator shell for motor vehicles of the "Ford" type, this shell is provided at its forward end with a beading 2 the inner edge of which is usually spaced from the radiator 3 so that an article may be readily inserted between the beading 2 and the radiator 3.

In the construction of my improved radiator shutter I provide a protecting plate 4 which is preferably formed of heavy cardboard or similar material cut to the proper size and shaped so as to readily fit the front end of the radiator shell as shown in Fig. 1 and entirely cover the outer face of the radiator. In order to provide for the adjustable air regulating feature, a portion of the plate 4 is cut out from the body thereof adjacent one end of the plate to provide a movable regulating plate 5. By cutting the plate 5 out from the main body portion 4 a comparatively large opening is formed through the body plate 4 and the draught of air through this opening is regulated through the adjustment of the plate 5 with respect to the opening.

Suitable guiding means is provided for the plate 5 by attaching the strips 6 to the edges of the opening at each end thereof, said strips 6 being provided with suitable openings for receiving fastening means. In order to complete the guiding means for the adjustable plate 5 Z shaped plates 7 are provided, one of the horizontal portions being disposed parallel with the strip 6 and struck out from this horizontal portion are the tongues 8 which extend through the openings in the strips 6 and through the plate 4 adjacent the ends of the opening in the plate and then bent over on to the plate 4 to securely retain the plate 7 and strip 6 in position.

Attention is directed to the fact that these Z shaped plates extend longitudinally of the body plate 4 from a point adjacent one end of the plate to a point adjacent the other end. The horizontal portion 9 of each of the plates 7 is arranged in spaced parallel relation with the strip 6 so as to provide a guideway for the ends of the plate 5. In view of the fact that the strip 6 extends only across the ends of the opening *a* in the plate 4 the body portion of the plate 4 will form the side wall of the guide beyond the ends of these strips as the horizontal portion 9 of each of the plates 7 is arranged in spaced relation with the plate 4 to form a continuous guide for the plate 4 which extends almost entirely across the length of the plate 4.

In positioning the shutter before the radiator 3 suitable retaining plates 10 are provided which extend beyond the longitudinal edges of the plate 4 and engage beneath the beading 2 of the hood as shown in Fig. 1. These plates 10 are secured to the body plate 5 by having portions thereof struck out from the plates to form penetrating tongues 11 which extend through the body of the plate 4 and are upset as shown in Fig. 3 to securely retain the plates 10 against movement.

In order to protect portions of the radiator from coming in contact with the movable plate 5 a strip 12 is extended transversely across the opening a with its ends connected to the body plate 4 adjacent the longitudinal edges of the opening, by means of rivets 13, which extend through the plate 4 and through the ends of the locking plate 14, said locking plate extending in spaced parallel relation with the strip 12 and having its ends engaged by the rivets 13 to retain both the strip 12 and plate 14 against movement. The plate 14 is provided with spaced openings 15 which are adapted to be engaged by the hook member 16 carried by one edge of the plate 5 for retaining the plate 5 in various adjusted positions.

Attached to the adjustable plate 5 adjacent one edge thereof is a metal strip 17 having penetrating tongues 18 struck out from the body of the strip which extend through the plate 5 and are upset to retain the strip 17 in position upon the plate. One end of the strip 17 is bent at right angles to the plate 5 to form a finger piece 19 adapted to be grasped by the hand of the operator for adjusting the plate 5 within its guideways, while the other end of the strip is engaged at right angles to the body of the strip in the direction opposite to the finger piece 19 to form a hook member 16. From this construction it will be apparent that the plate 5 may be quickly and readily adjusted over the opening a in the plate 4 for regulating the passage of air therethrough, by grasping the finger piece 19 and giving a slight outward and upward pull on the plate removing the hook 16 from any one of the openings 15 and then by moving the plate over the opening the hook 16 may be readily engaged within any one of the openings 15 for retaining the plate in various adjusted positions.

In order that the shutter may be securely locked in position, a pivoted locking plate 20 is connected to the upper edge of the plate 4, one end of the plate extending beyond the upper edge of the body plate so as to engage beneath the beading which extends across the forward end of the hood at the top of the radiator. This locking plate 20 is provided with an outstanding flange 21 which forms a suitable finger piece for manipulating the locking plate 20 to engage the same with the beading or disengage the same therefrom.

It will be apparent from the foregoing description taken in connection with the accompanying drawings that I have provided an extremely simple device which can be manufactured and placed upon the market at a comparatively low cost. It will be understood that the body plate 4 is preferably formed from a heavy cardboard although various other types of material may be used and the particular advantage of my improved shutter is in the saving of material from which the device is constructed as the shutter plate 5 is formed from the material cut from the opening a in the main body plate thus eliminating the necessity of providing additional material for the forming of this plate, and it will be noted that all of the elements which go to make up the entire construction of my device are of such character that they may be manufactured and fitted together in great quantities at a very low cost.

While I have shown and described the preferred form of my invention I wish it to be understood that various changes and alterations may be carried out during the manufacture of the same without departing from the spirit of the invention or the scope of the appended claims.

Having thus described my invention what I claim is:—

1. A radiator shutter including a body plate, a portion of said body plate being cut away to form an opening therethrough, the material from said cut away portion forming an adjustable closure plate, and means for supporting said closure plate in various adjusted positions with respect to the opening.

2. A radiator shutter including a body plate, having a portion thereof cut away within its outlines to form an opening through the body plate, the material from the cut away portion forming a movable closure plate, spaced guide members carried by the body plate for receiving the ends of the closure plate, a locking plate extending across the opening in the body plate, and means carried by the closure plate for engaging the locking plate to retain the closure plate in various adjusted positions with respect to the opening through the body plate.

In testimony whereof I affix my signature.

R. J. JONES.